Fig.-1

THROUGH 325 MESH CUT
— = 100 MICRONS

150 TO 200 MESH CUT
— = 100 MICRONS

100 TO 150 MESH CUT
— = 100 MICRONS

ON 80 MESH CUT
— = 500 MICRONS

FIG.-2

Robert W. Krebs  Inventor
By L. F. Mary  Attorney

THROUGH 325 MESH CUT
— = 100 MICRONS

150 TO 200 MESH CUT
— = 100 MICRONS

30 TO 60 MESH CUT
— = 1000 MICRONS

10 TO 14 MESH
— = 1000 MICRONS

FIG.-3

Robert W. Krebs  Inventor
By L. F. Kamp  Attorney

Fig.-4

Agglomeration Rate of Fluid Solids (35-80 Mesh Coke or Sand) vs. Feed Rate Bayway Pitch. 1025-1030°F.

Robert W. Krebs Inventor
By L. F. Ranx Attorney

Fig.-6

United States Patent Office 2,709,676
Patented May 31, 1955

2,709,676

PRODUCTION OF COKE AGGLOMERATES

Robert W. Krebs, Baton Rouge, La., assignor to Esso Research and Engineering Company, a corporation of Delaware Application May 5, 1951, Serial No. 224,801

6 Claims. (Cl. 202—14)

The present invention relates to the production of coke from hydrocarbonaceous materials. More particularly, the invention pertains to the production of petroleum coke in subdivided form from heavy hydrocarbon oils of the type of topped or reduced crude or similar distillation residues or pitches. In brief compass, the invention provides for the production of coke aggregates of marketable size by injecting heavy residual oils of the type specified into a fluidized mass of finely divided carbonaceous solids of substantially smaller size than that of the desired aggregates at conditions conducive to the agglomeration of these smaller particles to form stable aggregates of marketable size.

The production of coke from residual oils, particularly from the residues of atmospheric or vacuum crude distillation is well known in the art. Commercial coking processes of this type have for their principal purpose the production of lower boiling more valuable hydrocarbon oils of the gas oil and gasoline range, coke being formed as a by-product of the thermal cracking reaction involved. Until recent years, conventional coking practice involved preheating of the feed to coking temperatures in suitable heating coils followed by soaking of the oil at coking temperatures in a tank or drum in which the coking reaction was completed. The coke was deposited in the drum as a solid mass which after a certain length of time completely filled and plugged the drum. The process had to be interrupted at frequent intervals to remove the coke which was broken off and recovered in the form of large unwieldly chunks. Various methods have been proposed to eliminate these difficulties. Most of these methods involve the addition of subdivided inert adsorbent solids such as coke, sand, pumice, kieselguhr, spent clay, or the like to the feed to serve as a carrier for the coke and as a scouring agent preventing coke deposition on the equipment walls.

While moving bed and suspensoid systems may be used for this type of operation, the so-called fluid solids technique offers greatest advantages with respect to temperature control, heat economy, ease and continuity of operation as well as equipment dimension. This technique involves the injection of the feed into a relatively dense highly turbulent bed of hot subdivided solids ranging in size from about 30 to about 400 mesh. Fluidization is accomplished by gases and vapors flowing upwardly through the bed at a linear superficial velocity of about 0.3–5 ft. per second to give the bed the appearance of a boiling liquid separated by a definite interface from an upper disperse phase. Volatile products are removed overhead while coke in the form of coke-carrying solids may be recovered directly from the fluidized bed. The heat required for coking may be supplied by indirect heat exchange, limited internal combustion within the fluidized bed or continuous circulation of coke-carrying solids between the coking zone and a separate coke burning zone operated at a temperature above coking temperature.

Heretofore, the fluid solids technique has been adapted to the upgrading of crude residua exclusively for the principal purpose of producing lower boiling oils, by-product coke being recovered in the form of particles of fluidizable size, i. e., not substantially larger than about 30 mesh which is undesirable for marketing purposes. The production of substantially larger particles in the fluidized bed has been considered undesirable because of resulting fluidization difficulties. In addition, the growth of the solid particles in the fluid bed due to coke deposition thereon is insufficient to enlarge the particles from a readily fluidizable to a readily marketable size during practical residence times in the coking zone. However, in view of its outstanding thermal and procedural advantages an adaptation of the fluid solids technique to the production of marketable coke is highly desirable. The present invention provides this adaptation.

It is, therefore, the principal object of the invention to provide an improved process for the production of subdivided coke of marketable size from heavy hydrocarbonaceous residues employing the fluid solids technique. Other and more specific objects and advantages will appear from the following description of the invention wherein reference will be made to the accompanying drawing in which.

It has now been found that solids particles of fluidizable size maintained in the form of a dense, turbulent, fluidized mass resembling a boiling liquid may be agglomerated in the fluidized state to form aggregates of a size desirable for marketing by injecting a heavy residual oil into the fluidized mass at conditions conducive to at least partial coking of the residual oil. When the conditions of temperature, oil feed rate and fluidizing gas velocity are properly controlled, the fluidized particles are cemented together by the heavy sticky residue produced in the course of the partial coking of the residual oil feed to form stable, attrition resistant aggregates which further harden upon cooling to normal temperatures. This agglomeration effect is entirely different from, and cumulative to, the growth of individual particles resulting from the deposition of coke thereon as it has been observed and utilized in various prior art coking processes. The increase in size obtainable by the particle agglomeration in accordance with the present invention is a high multiple of that resulting from particle growth by coke deposition. For example, particle growth by coke deposition on the individual particles may increase the particle size by about 50–100 per cent within practical coking times. Agglomeration in accordance with the invention, on the other hand, produces coke particles of about 10–100 times the original particle size and permits the production of coke particles of up to about ¼ inch diameter in a fluidized solids bed.

Specific reaction conditions suitable for the purposes of the invention depend to some extent on the character of the residual oil feed and the solids making up the fluidized bed. In general, temperatures of about 700°–1050° F. are operative for most residual oil feeds. Within this range the temperature may be the higher the higher the Conradson carbon content or refractoriness of the feed. Temperatures of about 800°–900° F. produce sticky cementing residues from most feeds within relatively short times and are, therefore, preferred. In order to provide sufficient proportions of sticky residue, the oil feed rate should be relatively high, feed rates of about 0.3–0.9 vols. of liquid oil per volume of unaerated solids per hour (v./v./hr.) being generally suitable. Again, feed stocks of relatively high refractoriness or Conradson carbon content or the application of low bed temperatures require lower feed rates than low Conradson carbon feed stocks or high bed temperatures within the ranges specified. The fluidizing gas velocity depends largely on the density and size of the original particles as well as on the size of the coke particles to be recovered. It should be so controlled that particles within the original size range and somewhat larger particles are well fluidized to form a dense turbulent mass having a definite upper interface, while particle agglomerates of the desired marketable size are permitted selectively to settle to the bottom of the fluidized bed from which they may be removed in a non-fluidized condition. Broadly, velocity ranges of about 0.5–5 ft. per second may be used for this purpose in connection with such solids as coke, sand, clays, etc. having original particle sizes within the range of 35–200 mesh. Solids of relatively low density, such as coke, require lower fluidization velocities, say, about 0.5–3 ft. per second than solids of relatively high density, such as sand, which may require 1–5 ft. per second for this purpose. Coke which yields the highest grade marketable product is the preferred seed solid of the invention. The dimensions of the agglomeration vessel should be chosen to allow for an average solids residence time therein of about 0.5–5 hours at the conditions specified above.

In operation, fine fluidizable seed solids are continuously supplied to the fluidized mass while the liquid residual oil feed is injected, preferably by fine spraying or atomization into the body of the bed at one or more points. Fluidizing gas is supplied into the bottom of the bed through suitable conventional distributing means. Heat may be supplied by preheat of process solids and fluids, by indirect heat exchange or by a limited combustion carried out in the fluidized bed in any conventional manner. In accordance with a highly desirable modification of the invention, the cross-sectional area of the agglomerating vessel expands upwardly so as to permit a steady increase of the fluidizing gas velocity toward the bottom of the vessel. Against this steadily increasing velocity, only the largest agglomerates can settle and conditions may be readily so controlled that only agglomerates of the desired marketable size range are collected in the bottom of the vessel for recovery. Above this settling zone the bed remains fluidized, though exhibiting a certain degree of classification by particle size over the height of the bed.

Extensive vaporization of volatile feed constituents and a limited degree of thermal cracking to gas oil, gasoline and gases take place as desirable side reactions. These products are carried overhead by the fluidizing gas and may be passed to conventional product recovery equipment, preferably after separation of entrained solids fines which may be returned to the fluidized bed as seed solids. Owing to the relatively high feed rates and low temperatures required for an efficient operation of the agglomeration process of the invention, the yields of valuable volatile products such as gas oil and gasoline are substantially lower than in conventional coking processes. However, in accordance with a preferred embodiment of the invention the agglomeration process may be combined with a coking procedure affording optimum yields of valuable volatile cracking products, without any sacrifice in the efficiency of either element of the combined process.

It has been pointed out above that in conventional fluid coking directed to the production of maximum yields of gas oil and gasoline, any excessive particle growth, such as by agglomeration, must be carefully avoided to prevent fluidization troubles, such as channelling, which detrimentally affect the thermal and production balance of the process. The present invention provides a highly valuable means for maintaining the desired particle size distribution in a coking zone of this type while simultaneously producing large coke particles of marketable size. For this purpose, a fluid-type coking zone operated for the production of gas oil and gasoline may be continuously supplied with fresh seed coke of fluidizable size, say of about 20–150 microns, while product coke is continuously withdrawn from the dense phase. The hold-up of this fluid coking zone is so chosen that the withdrawn coke has remained in the coking zone for a time sufficient to increase its size by not more than about 50–100 per cent due to coke deposition. Particle sizes of this dimension are not conducive to fluidization trouble; simultaneously they represent the most desirable size range for the seed solids of the agglomeration stage of the invention. At least a substantial portion of these withdrawn particles is, therefore, supplied as seed solids to the agglomeration stage to be converted therein to marketable coke as described above. In this manner, the two stages cooperate to afford optimum conditions in each stage and maximum production of valuable volatile cracking products and coke of marketable size.

The invention and its beneficial effects will be further illustrated by the following experimental studies and results.

In a laboratory scale fluid reactor a 2.4 per cent South Louisiana residuum was coked on fluidized sand having a particle size of 80–325 mesh at a temperature of 1060°–1090° F., a residuum feed rate of 0.83 w./hr./w. (0.64 v./v./hr.) and 40 wt. % of steam diluent based on residuum resulting in a fluidizing velocity of about 0.8 ft. per second, for 15 and 30 minutes in two separate runs, I and II, respectively. The feed was injected through a spray nozzle into the fluid bed, steam being fed through a distributing grid to the bottom of the bed below the point of feed injection. Heat was supplied by indirect external heating of the bed. The particle size distribution of the solids was determined by screen analyses before and after the runs and microphotographs were taken of various cuts. The results of these experiments are illustrated in Figures 1–3 of the drawing.

Figure 1:
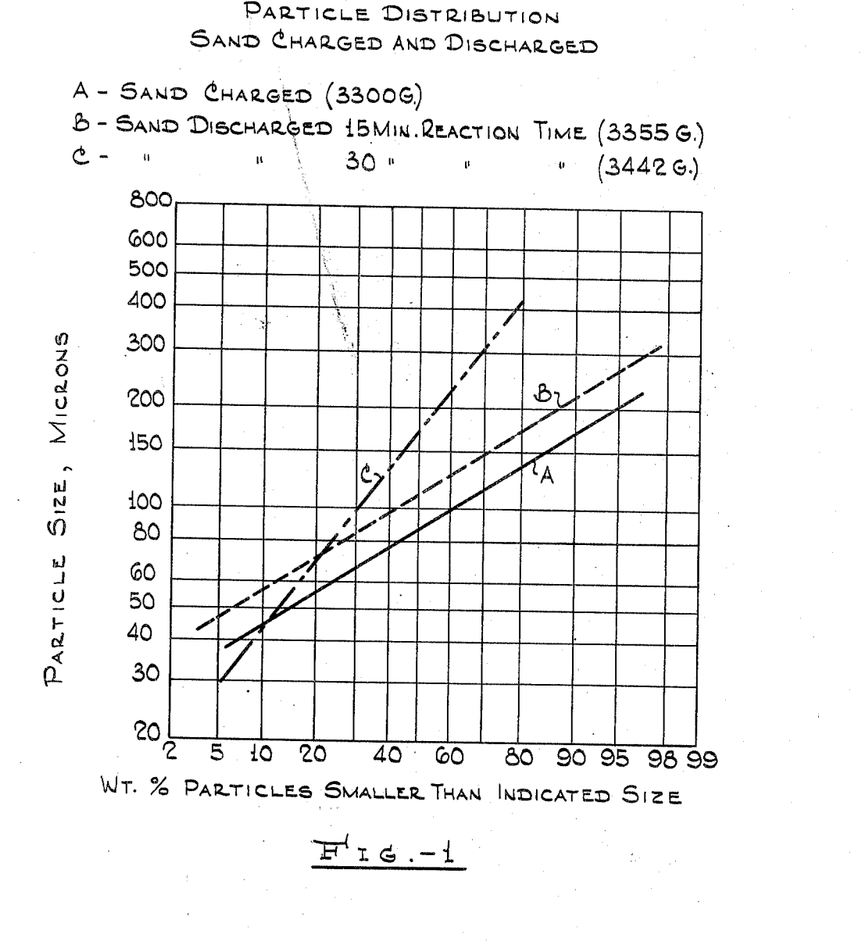
Figures 1, 4 and 5 are graphical illustrations of the effects obtainable by the process of the invention.

In Figure 1 the particle size distribution of the solids prior to coking (curve A) and after Run I (curve B) and Run II (curve C) is shown graphically by plotting the weight per cent distribution data on a logarithmic-probability scale, so that a normal Maxwellian particle size distribution will appear as a straight line. For Run I, the discharged sand shows a fairly uniform increase in particle size throughout the particle size range as compared with the solids charged. In the case of Run II, the particle size distribution of the solids discharged after 30 minutes shows a sharp increase in the proportion of larger particles compared with the sand charged on the solids discharged after 15 minutes operation (Run I).

Figure 2:
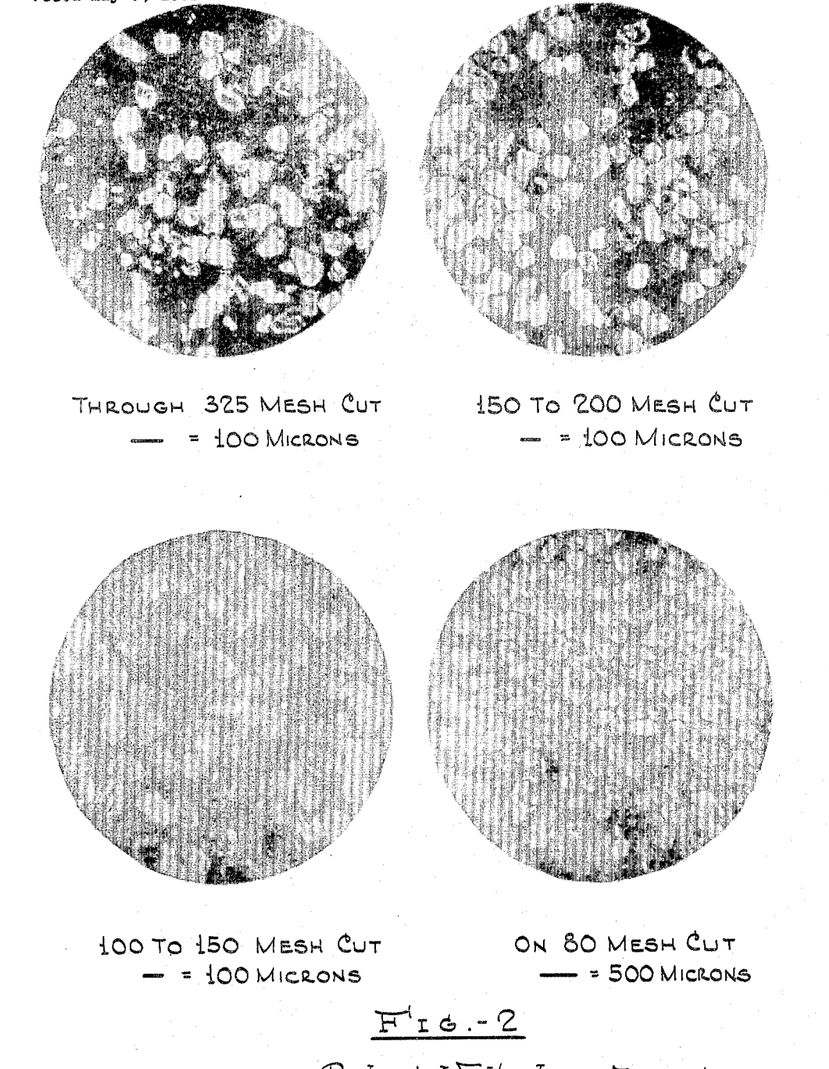
Figures 2 and 3 are photomicrographs illustrating the formation, composition and appearance of coke produced by the process of the invention.
Figure 3:
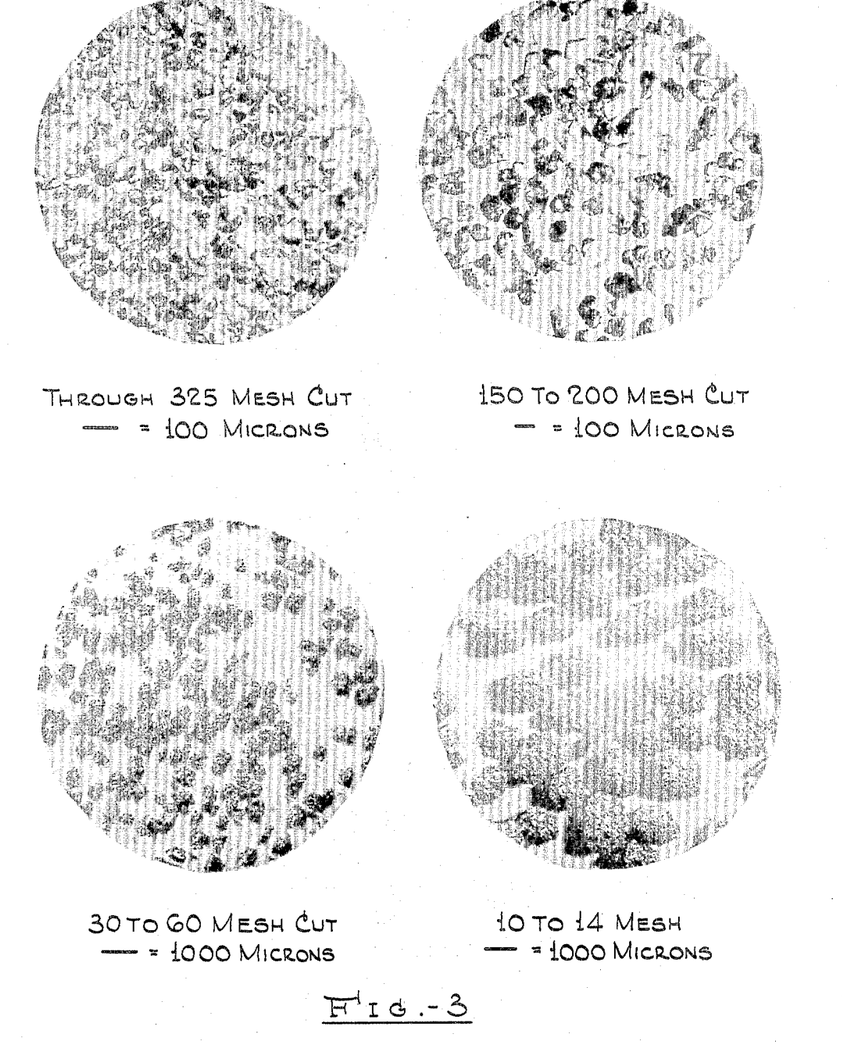

The cause of this increase in particle size is clearly apparent from the photomicrographs of Figures 2 and 3. As shown in the pictures of Figure 2, the particles of all cuts of the sand as charged are individual solid elements. Substantially, the same is true for the two finest cuts of the solids discharged from Run I (Figure 3), although a few particles have a kidney-like structure indicating that a few smaller particles have agglomerated to form these aggregates. However, the two largest cuts consist exclusively of aggregates formed by the agglomeration of a large number of smaller particles as clearly shown by their granulated structure. Similar cuts taken from the discharged solids of Run II had the same composition and appearance.

The above experimental results demonstrate conclusively that in coking on fluidized solids substantial agglomeration of smaller particles may be accomplished in addition to coke deposition on the individual particles.

The fact that agglomerates of more than 2 mm. in diameter (10-14 mesh cut of Figure 3) were formed from particles originally smaller than 0.25 mm. within 15 minutes at relatively high temperatures and low oil feed rates, both unfavorable to particle agglomeration, demonstrates the feasibility of forming coke agglomerates of marketable size within short contact times at the conditions of the present invention.

Figure 4:
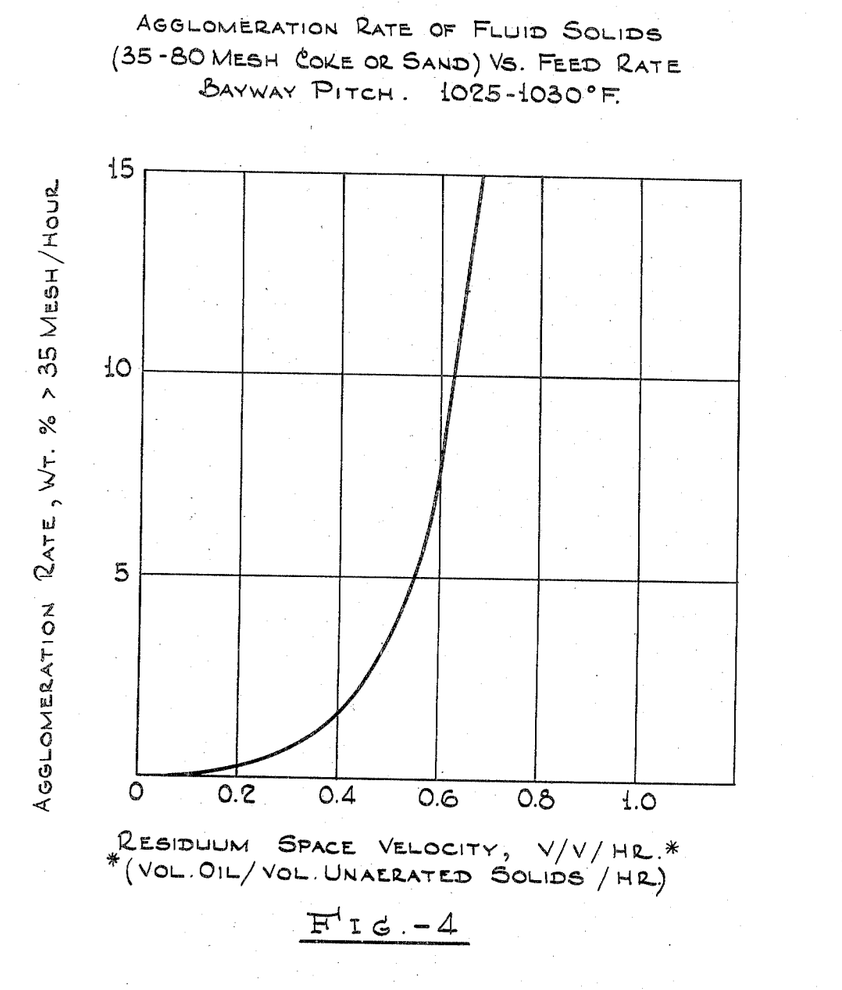

This fact is further borne out by experiments carried out to study the effect of oil feed rate on particle agglomeration. The experimental procedure was substantially the same as that described above except that a vacuum pitch obtained from a crude mixture consisting largely of West Texas crude was used as the oil feed; the temperature was 1025°-1030° F., the particle size of the charged sand was 35-80 mesh and the feed rate was varied from 0.4-0.7 w./hr./w. (0.3-0.6 v./v./hr.). The run length was about 5 hours for each feed rate. Similar experiments were conducted using 35-80 mesh coke instead of sand. The results of both these experiments are graphically illustrated in Figure 4 wherein feed rate is plotted again agglomeration rate. It will be noted that the slope of this curve becomes increasingly steeper as the feed rate is increased which means that the agglomeration rate (and with it the size of the agglomerates) increases as oil feed rate is increased. At the preferred feed rates of the invention, agglomeration rates conducive to the formation of coke of marketable size may be reached, even at the unfavorably high temperatures used in these experiments. While the above experiments were carried out using sand or coke as the fluidized contacting solids, it is noted that analogous experiments carried out with silica gel yielded similar results.

Figure 5:
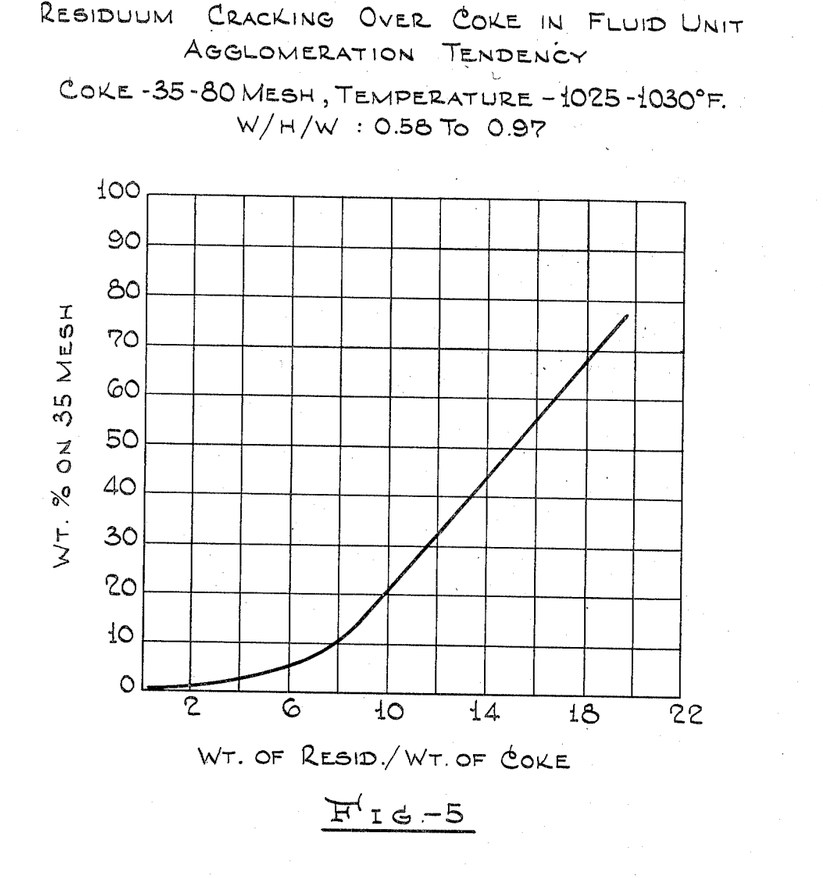

In the experiments using coke, a 26 hour run was made on petroleum coke originally of 35-80 mesh particle size with the vacuum pitch described above as the oil feed. The temperature was 1025°-1030° F. and the oil feed rate was varied from 0.6-1.0 w./hr./w. (0.5-0.8 v./v./hr.). The coke was discharged at intervals, weighed and screen analyses and microscopic observations of the coke were made. Excess coke was removed and the run continued on the discharged coke. Results illustrating the agglomeration tendency of the coke are illustrated by the graph of Figure 5 wherein particle size (weight per cent on 35 mesh) is plotted against total run hours expressed as weight of residuum fed over weight of coke. The curve demonstrates rapid increase in agglomeration as the exposure of the coke to oil increases. Microscopic examination of the discharged solids indicated that while some of the increase in the "on 35 mesh" material is due to growth of individual particles by coke deposition, by far the major portion of this material is agglomerates. Examination of the larger agglomerates (on 20 mesh) showed that the spaces between the particles forming the agglomerate were filled in with coke. These experiments thus demonstrate that the process of the invention permits the production of coke particles of marketable size from petroleum coke of fluidizable size by contacting them with heavy oil residues at coking conditions in fluid operation in accordance with the present invention.

A preferred modification of this last-mentioned embodiment of the invention will now be described with reference to Figure 6. The system illustrated therein essentially comprises a fluid coker 1 and a fluid-type agglomerator 25 which may be operated in accordance with the invention as follows.

Coker 1 contains a dense, turbulent, fluidized mass $M_1$ of petroleum coke maintained at a coking temperature of about 900°-1400° F. in any manner known in the art of fluid coking (not shown). While indirect heating or partial combustion within mass $M_1$ may be used for this purpose, heat supply by continuously circulating solids between coker 1 and a heat generating coke-burning zone is preferred. Systems of this type are well known as demonstrated by such patents as U. S. 2,436,160; U. S. 2,485,315; and others and need not be described herein for a proper understanding of the present invention.

Coke of fluidizable size, say about 20-150 microns diameter, is continuously supplied to mass $M_1$ via line 3. A fluidizing gas such as steam, hydrocarbon gases or vapors, etc., is fed from line 5 through suitable distributing means such as grid 7. The oil feed such as a vacuum residuum with an initial boiling point of 900°-1200° F. may be injected through line 9 and spray nozzle 11 into the body of mass $M_1$. Vaporization and cracking of the oil feed take place in mass $M_1$ which is fluidized by the combined action of fluidizing gas and product vapors to assume an apparent density of about 30-80 lbs./cu. ft. and a definite interface $L_1$. Volatile coking products are withdrawn overhead from level $L_1$ and may be passed through line 13 to conventional catalytic cracking or product recovery equipment (not shown), preferably after separation of entrained coke fines in cyclone 15 provided with dip-pipe 17. Fluidized solids are withdrawn via line 19 directly from mass $M_1$.

The hold-up of reactor 1 may be readily controlled by varying the solids feed and withdrawal rates so that at the prevailing conditions of temperature and oil feed rate the increase in particle size within mass $M_1$ is restricted to about 50-100% and the solids withdrawn through line 19 are not larger than about 80 mesh, on the average and preferably fall within the range of about 35-200 mesh. Particle sizes of this order may be tolerated in coker 1 without fluidization difficulties. Temperatures of about 950°-1100° F. and feed rates of about 0.3-1.5 v./v./hr., depending largely on the temperature, are generally suitable at average solids residence times of about 0.1-1.0 hour. In general, the higher the temperature the higher may be the feed rate within the ranges specified. A portion of the solids withdrawn through line 19 may be circulated through line 21 to a burner vessel and returned via line 3 for heat supply, as indicated above.

The remainder of the solids withdrawn through line 19 is passed via line 23 substantially at the temperature of mass $M_1$ to agglomerator 25 to serve as seed coke therein. Agglomerator 25 preferably has the shape of an inverted cone provided in its bottom with a gas distributing grid 27 through which a fluidizing gas such as steam or any other inert gas preferably preheated to about 900°-1000° F. may be supplied to agglomerator 25 from line 29. The slope of the agglomerator walls is preferably such that the linear superficial velocity of the gas introduced through grid 27 is steadily reduced as it flows upwardly to reach about 10-50% of its original value in the top of agglomerator 25. A heavy residual oil which may be the same as that supplied to coker 1 or a material of higher Conradson carbon content or higher refractoriness such as a coker cycle stock may be fed to agglomerator 25 through line 31 and spray nozzle 33, preferably after preheating to about 500°-700° F.

The fluidization conditions in agglomerator 25 are so controlled that a highly turbulent, well fluidized solids mass $M_{25}$ having an upper interface $L_{25}$ is formed in the upper and intermediate portions of agglomerator 25. Initial linear superficial velocities of the fluidizing gas of about 3-10 ft. per second in the bottom of agglomerator 25 are suitable for this purpose at the particle sizes specified. The temperature of mass $M_{25}$ is preferably maintained at about 800°-950° F. which may be readily accomplished by the preheat of the process materials as indicated since only a limited endothermic reaction takes place in agglomerator 25. The oil feed rate may be about 0.3-1.0 v./v./hr. and is preferably about 0.5-0.9 v./v./hr. at the conditions specified. Solids residence times in agglomerator 25 may be about 0.5–5 hours, preferably about 0.5 to 1.0 hour.

When so operating, solids agglomeration within mass $M_{25}$ takes place at a rapid rate. Agglomerated coke particles exceeding a size of about 0.1 inch mesh have a pronounced settling tendency at all gas velocities prevailing in agglomerator 25. These large particles accumulate in the bottom of agglomerator 25 above grid 27 to form a relatively quiescent layer from which they may be continuously withdrawn through line 35. Smaller particles down to a size of about 100 mesh remain fluidized to form mass $M_{25}$ whose concentration of relatively coarse particles steadily decreases over its height. Solids fines substantially smaller than 100 mesh are entrained by the mixture of fluidizing gas and product vapors passing overhead from level $L_{25}$ to be withdrawn and passed to suitable product recovery equipment (not shown) through line 37 preferably after fines separation and return in cyclone 39 provided with dip-pipe 41.

The solids withdrawn through line 35 are of marketable size and may be recovered as product coke. Any desired portion thereof may be branched off via line 43, ground to a fluidizable size and returned to coker 1, agglomerator 25 or any burner vessel used in conjunction with coker 1 for heat supply.

Figure 6:
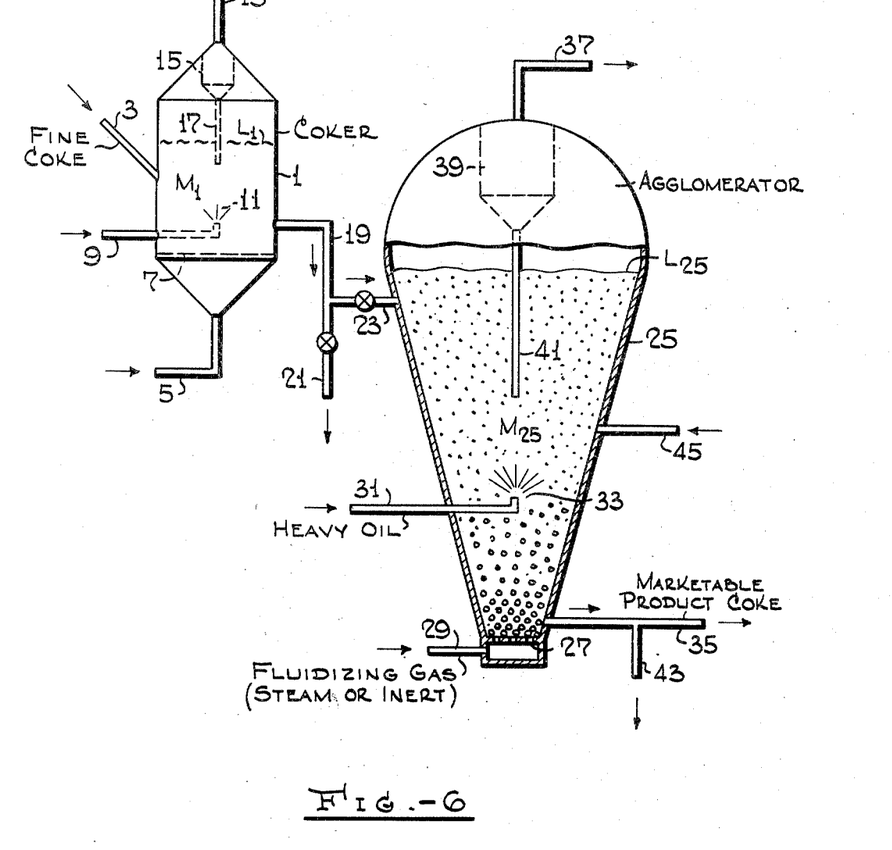
Figure 6 is a schematical illustration of a system adapted to carry out a preferred embodiment of the invention.

The system illustrated in Figure 6 consists of various modifications. For example, heat may be supplied to mass $M_{25}$ by adding a combustion-supporting gas, such as air and/or oxygen, through line 45 to support a limited combustion within mass $M_{25}$ for heat generation. If a burner vessel is used in conjunction with coker 1, hot burner solids may be directly supplied to mass $M_{25}$. These hot solids may be added at such a rate as to maintain the agglomeration zone in the preferable range of 800°–950° F. supplying the heat of reaction and the sensible heat of the reactants and gases. Indirect heat exchange may also be used for maintaining the temperature of mass $M_{25}$. Other modifications within the spirit of the invention will appear to those skilled in the art.

The above description and exemplary operations have served to illustrate specific embodiments of the invention but are not intended to be limiting in scope.

What is claimed is:

1. The process of producing marketable pelletized coke from heavy hydrocarbonaceous liquid oil residue having an initial boiling point above about 900° F., which comprises supplying a fluidized mass of preheated carbonaceous solid particles of about 30 to 400 mesh particle size to a primary coking zone, spraying said oil residue into said zone to contact said particles and to convert said residue to more volatile products plus coke deposited upon said particles, thereby causing said particles to grow by accretion of coke in layers, passing the particles thus augmented in size but while still fluidizable, to a secondary zone, establishing a fluidized bed of said augmented particles in said secondary zone by passing a gasiform fluid upwardly therethrough, feeding additional oil residue into said fluidized bed under such conditions as to cause the augmented particles to cohere and form agglomerate coke pellets of about 10 to 100 times the size of the original augmented particles, which pellets become too large to remain fluidized and hence fall by gravity against the upflowing gasiform fluid, collecting said pellets in an unfluidized mass in the bottom of said secondary zone, and withdrawing pelletized coke product from the bottom of said secondary zone.

2. The process of claim 1 in which said mass is maintained at a temperature between 800 and 900° F. and is fluidized by a gaseous medium flowing upwardly through said zone, the cross-sectional area of said zone increasing steadily from its bottom to its top at such a rate that said medium flows in the top of said zone at a velocity amounting to about 10–50% of its velocity in the bottom of said zone.

3. The process of producing distillate oils and coke of marketable size from liquid hydrocarbonaceous residues having an initial boiling point of about 900 to 1200° F., which comprises subjecting a portion of said liquid hydrocarbonaceous residue in a coking zone to coking in the presence of a dense, turbulent, fluidized mass of carbonaceous solids of fluidizable size ranging from about 35 to 200 mesh at a coking temperature of about 950 to 1100° F. and at conditions conducive to the production of relatively large proportions of distillate oils and the deposition of coke on said solids to moderately increase the size of individual particles of said solids by accretion of layers of deposited coke without appreciable agglomeration of said solids to particles of nonfluidizable size, recovering distillate vapors from said coking zone, withdrawing coked solids particles of fluidizable size from said coking zone, supplying at least a portion of said withdrawn coked solids to a dense turbulent mass of carbonaceous solids fluidized in an agglomeration zone by an upwardly flowing gaseous medium, injecting another portion of the aforesaid liquid hydrocarbonaceous residue into said last-named mass at least partially in the liquid state and at a rate of about 0.5 to 0.9 volumes of liquid residue per volume of the last-named fluidized solids per hour, maintaining said last-named mass at a coking temperature of about 800 to 900° F., controlling said temperature, solids residence time, and the feed rate of said last-named residue at levels conducive to the agglomeration of said coked solids to form agglomerated coke pellets too large to remain fluidized and which therefore settle to the bottom of said agglomeration zone by gravity against the upwardly flowing medium, said pellets each being composed of a plurality of said coked solids particles and ranging in diameter from about 0.1 to 0.25 inches, and recovering said agglomerates from said agglomeration zone.

4. The process of claim 3 in which said coking zone is operated at a temperature higher than said agglomerating temperature, substantially all the heat required in said agglomeration zone being supplied as sensible heat of materials supplied to said agglomeration zone.

5. The process of claim 4 in which the cross-sectional area of said agglomeration zone increases steadily from its bottom to its top at such a rate that said medium flows in the top of said agglomeration zone at a velocity amounting to about 10–50% of its velocity in the bottom of said agglomeration zone, said agglomerates being withdrawn from a bottom portion of said agglomeration zone.

6. The process of converting heavy hydrocarbon oil to more volatile oil products plus a coke product of marketable pellet size, which comprises establishing in a primary coking zone a fluidized preheated mass of finely divided solid particles to serve as seed or nuclei for deposition of coke, maintaining a coking temperature in said mass within the range of about 950 to 1100° F., feeding part of the oil to be converted in liquid, subdivided form to contact the preheated particles in said primary zone at a suitable feed rate to convert said oil substantially entirely to more volatile products and coke deposited as a layer on individual particles and without substantial agglomeration of said particles, recycling a part of the deposit-bearing particles through a heater and back to the primary zone to supply heat and thereby maintain coking temperature, passing another part of the deposit-bearing particles while still substantially at coking temperature to an agglomerating zone, passing a fluidizing gasiform stream upwardly through the agglomerating zone to fluidize said deposit-bearing particles, feeding another portion of said heavy oil into contact with said last mentioned particles in the agglomerating zone at a rate faster than said particles, by reason of their heat content, can convert completely to dry coke whereby said deposit-bearing particles are caused to cohere and agglomerate into pellets too large to remain fluidized or suspended by the gasiform stream in the agglomerating zone and which therefore fall by gravity to the bottom of the agglomerating zone, and withdrawing said pellets from said bottom as product coke.

References Cited in the file of this patent

UNITED STATES PATENTS

| | | |
|---|---|---|
| 1,983,943 | Odell | Dec. 11, 1934 |
| 2,339,932 | Kuhl | Jan. 25, 1944 |
| 2,362,270 | Hemminger | Nov. 7, 1944 |
| 2,366,055 | Rollman | Dec. 26, 1944 |
| 2,390,031 | Schutte et al. | Nov. 27, 1945 |
| 2,445,328 | Keith | July 20, 1948 |
| 2,456,796 | Schulte | Dec. 21, 1948 |
| 2,511,088 | Whaley | June 13, 1950 |
| 2,560,357 | Martin et al. | July 10, 1951 |
| 2,600,078 | Schutte et al. | June 10, 1952 |
| 2,623,010 | Schutte | Dec. 23, 1952 |
| 2,624,696 | Schutte | Jan. 6, 1953 |

FOREIGN PATENTS

| | | |
|---|---|---|
| 585,354 | Great Britain | Feb. 5, 1947 |